United States Patent
Waldner

(10) Patent No.: US 7,798,533 B2
(45) Date of Patent: Sep. 21, 2010

(54) VENTILATION CHIMNEY SECTION AND METHOD

(76) Inventor: John Waldner, Box 490, Macgregor, Manitoba (CA) R0H 0R0

( * ) Notice: Subject to any disclaimer, the term of this patent is extended or adjusted under 35 U.S.C. 154(b) by 680 days.

(21) Appl. No.: 11/727,313

(22) Filed: Mar. 26, 2007

(65) Prior Publication Data

US 2007/0228733 A1 Oct. 4, 2007

Related U.S. Application Data

(60) Provisional application No. 60/786,738, filed on Mar. 29, 2006.

(51) Int. Cl.
  *F16L 11/12* (2006.01)
(52) U.S. Cl. .......... 285/123.16; 285/47; 285/424; 454/44; 156/259; 138/114
(58) Field of Classification Search .......... 285/47, 285/123.3, 123.16, 424; 138/171, 113, 114; 156/258; 454/44
  See application file for complete search history.

(56) References Cited

U.S. PATENT DOCUMENTS

| 583,819 | A | * | 6/1897 | Rome | 285/123.16 |
|---|---|---|---|---|---|
| 696,059 | A | * | 3/1902 | Line | 285/55 |
| 1,085,303 | A | * | 1/1914 | Scherer | 285/123.16 |
| 1,158,855 | A | * | 11/1915 | Robinson | 138/114 |
| 1,429,822 | A | * | 9/1922 | Acer | 285/123.16 |
| 2,013,193 | A | * | 9/1935 | Stadtfeld | 138/114 |
| 2,076,210 | A | * | 4/1937 | Stadtfeld | 138/113 |
| 2,650,112 | A | * | 8/1953 | Kinkead | 285/47 |
| 2,679,867 | A | * | 6/1954 | Epstein | 285/123.16 |
| 2,894,537 | A | * | 7/1959 | Carr | 138/143 |
| 3,170,544 | A | * | 2/1965 | Kinkead et al. | 285/47 |
| 3,272,537 | A | * | 9/1966 | Bellatorre et al. | 285/187 |
| 3,464,450 | A | * | 9/1969 | Steffenini | 138/113 |
| 3,800,846 | A | * | 4/1974 | Kurz | 160/35 |
| 3,882,382 | A | * | 5/1975 | Johnson | 324/694 |
| 4,111,107 | A | * | 9/1978 | Engleke | 454/45 |
| 4,215,727 | A | * | 8/1980 | ter Wijlen | 138/112 |
| 4,462,618 | A | | 7/1984 | Stone | |
| 4,846,147 | A | * | 7/1989 | Townsend et al. | 126/307 R |
| 5,199,747 | A | * | 4/1993 | Jahr | 285/47 |
| 5,934,337 | A | * | 8/1999 | Fiala et al. | 138/149 |
| 6,180,954 | B1 | * | 1/2001 | Verrier et al. | 250/492.21 |
| 6,521,155 | B1 | * | 2/2003 | Wunsch | 264/150 |
| 6,775,992 | B2 | * | 8/2004 | Cooper | 62/50.7 |
| 6,848,720 | B2 | * | 2/2005 | Carns et al. | 285/123.15 |
| 7,156,126 | B2 | * | 1/2007 | Topek et al. | 138/117 |
| 7,216,898 | B1 | * | 5/2007 | Hermanson | 285/405 |
| 2004/0026015 | A1 | | 2/2004 | Frantz et al. | |

* cited by examiner

*Primary Examiner*—David E Bochna

(57) ABSTRACT

A ventilation chimney or exhaust fan flue section for hog barns has inner and outer plastic tubes formed by edge welding plastic sheets. A snug fitting insulation sheet is slid between the tubes. Collars of male and female coupling elements are inserted into the ends of the section between the inner and outer tubes and secured by screws passing through the outer tube and into the collars. The chimney can be installed by combining sections using a suitable adhesive.

13 Claims, 2 Drawing Sheets

VENTILATION CHIMNEY SECTION AND METHOD

This application claims priority of U.S. provisional patent application No. 60/786,738, Ventilation chimney section and method, to John Waldner, filed 29 Mar. 2006, which is incorporated herein by reference.

This invention is directed to a method of manufacture of ventilation chimney sections and ventilation chimney sections, also called exhaust fan flues.

BACKGROUND AND PRIOR ART

Ventilation is important in livestock raising barns in general and hog barns in particular. Ventilation chimneys typically with an associated fan are used to exhaust air from the barns. Generally these chimneys are assembled from prefabricated sections.

Currently sections are made from rotary molded "rotomolded" plastic tubes, and from a plastic sheet welded longitudinally to form a tube. As the chimneys ventilate to the outside air, they tend to ice up in winter. Sometimes chimneys are insulated after installation in the barn attic to overcome the icing problem. Some sections are formed from inner and outer tubes welded longitudinally from plastic sheets, and spaced at the ends by a circular spacer typically ¼ inch thick.

None of these solutions are particularly satisfactory, although better than no ventilation.

The invention is directed to a method of forming an insulated chimney section by forming inner and outer tubes by welding plastic sheets to form tubes, inserting a sheet of insulation formed into a tube between inner and outer tubes, and attaching a male coupling at one end and a female coupling at the other. The male and female couplings are adapted to engage matingly. The invention is also directed to chimney sections manufactured by the method and chimneys constructed from the sections.

Although the invention is described with respect to methods of manufacture of chimney section by welding plastic sheets into inner and outer tubes and inserting a sheet of insulation between the inner and outer tubes and attaching male and female coupling s at the ends, sections manufactured by the method and chimneys constructed from the sections, it will be apparent to those skilled in the art that the invention is not limited to the method of manufacture, sections and chimneys, but extend to similar methods, sections and chimneys.

It is a principal object of the invention to provide a chimney section having plastic inner and outer tubes separated by insulation. It is a subsidiary object of the invention to provide a chimney section having male and female couplings fitted into the space between the inner and outer tubes. It is a further principal object of the invention to form a chimney section by welding a plastic sheet to form an outer tube and welding another plastic sheet to form an inner tube, and to insert the inner tube inside the outer tube and slide a sheet of insulation material having touching edges between the inner and outer tubes. It is a further object of the invention to insert a male coupling at one end of the section fitting between the inner and outer tubes and to insert a female coupling at the other end of the section fitting between the inner and outer tubes. Other objects will be apparent to those skilled in the art from the following specification, accompanying drawings and appended claims.

DESCRIPTION OF THE INVENTION

The invention in one broad aspect is directed to a method of manufacture of a ventilation chimney section comprising welding plastic sheets to form inner and outer cylindrical tubes placing the inner tube within the outer tube and sliding a sheet of insulation between the inner and outer tube. Preferably the plastic sheets are cut to the desired length, and the desired width, that is π times the desired diameter of the tubes, which are then edge welded to form the inner and outer tubes. The sheet of insulation is similarly cut, most preferably slightly shorter in length to allow for the coupling elements. The thickness of the sheet of insulation is set to be slidable within the space between the inner and outer tubes. The sheet of insulation is preferably cut into a plurality into a plurality of segments, alignable parallel to the common axis of the tubes, before sliding the sheet between the inner and outer tubes. Each segment fills a longitudinal portion of space between the inner and outer tubes. Preferably the sheet of insulation is cut into four quarter cylindrical segments, alignable parallel to the common axis of the tubes. Most preferably the sheet fits snugly between the inner and outer tubes. Preferably the collar of a male coupling element is inserted into one end of the section between the inner and outer tubes and secured therein. Preferably the collar of a female coupling element is inserted into the other end of the section between the inner and outer tubes and secured therein. The male coupling element is adapted to matingly engage a female coupling identical to the female coupling element and vice versa. Preferably the collars are secured between the inner and outer tubes by fasteners, which are preferably screws, although plastic rivets may also be used, extending through the outer tube and into the collar.

In another broad aspect the invention is directed to a chimney ventilation section comprising coaxial inner and outer plastic tubes separated by a sheet of insulation in the space between the inner and outer tubes. Preferably the sheet of insulation fits snugly between the inner and outer tubes. Preferably the sheet of insulation has four quarter cylindrical segments aligned parallel to the common axis of the tubes. Conveniently the collar of a male coupling element is inserted into one end of the section between the inner and outer tubes and secured therein. Conveniently the collar of a female coupling element is inserted into the other end of the section between the inner and outer tubes and secured therein. The male coupling element is adapted to matingly engage a female coupling identical to the female coupling element and vice versa. Usually the collars are secured between inner and outer tubes by fasteners. Preferably the fasteners are screws extending through outer tubes and into the collars. A preferred form of male coupling element has a first circumferential wall abutting the collar of the male coupling element projecting outward, a first inner cylindrical sleeve at the inner edge of the first circumferential wall. The first sleeve forms a plug to engage a socket of a female coupling element. The preferred form of the female coupling element has a second circumferential wall abutting its collar projecting outward, a second outer cylindrical sleeve at the outer edge of the second circumferential wall. The second sleeve and second wall form a socket to engage a plug of a male coupling element. Both circumferential walls surround a central fluid passage communicating with the fluid passage of the section.

DESCRIPTION OF THE PREFERRED EMBODIMENTS

Figure 1:
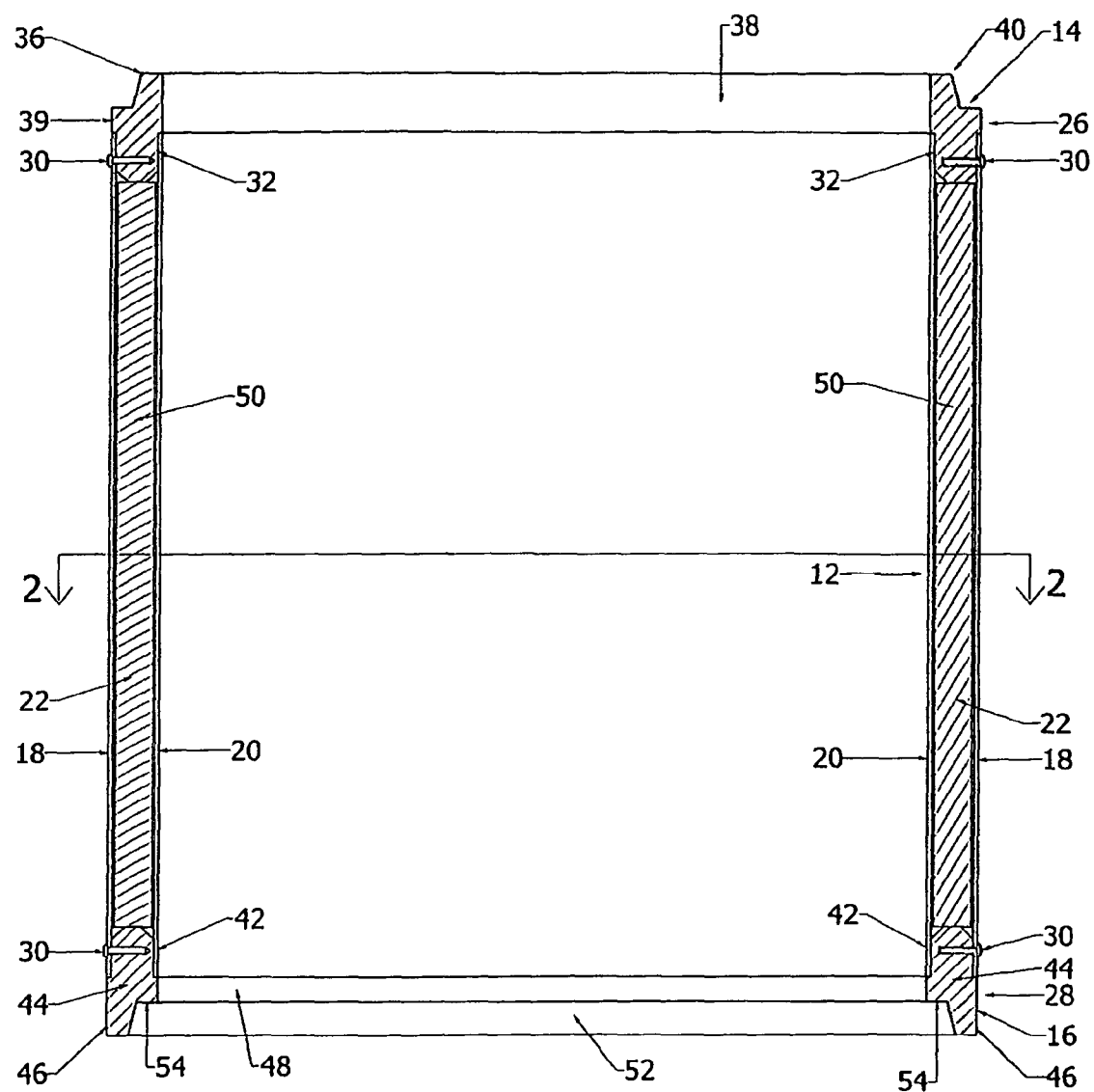
FIG. 1 shows a cross sectional elevational view of a ventilation chimney section of the invention.
Figure 2:
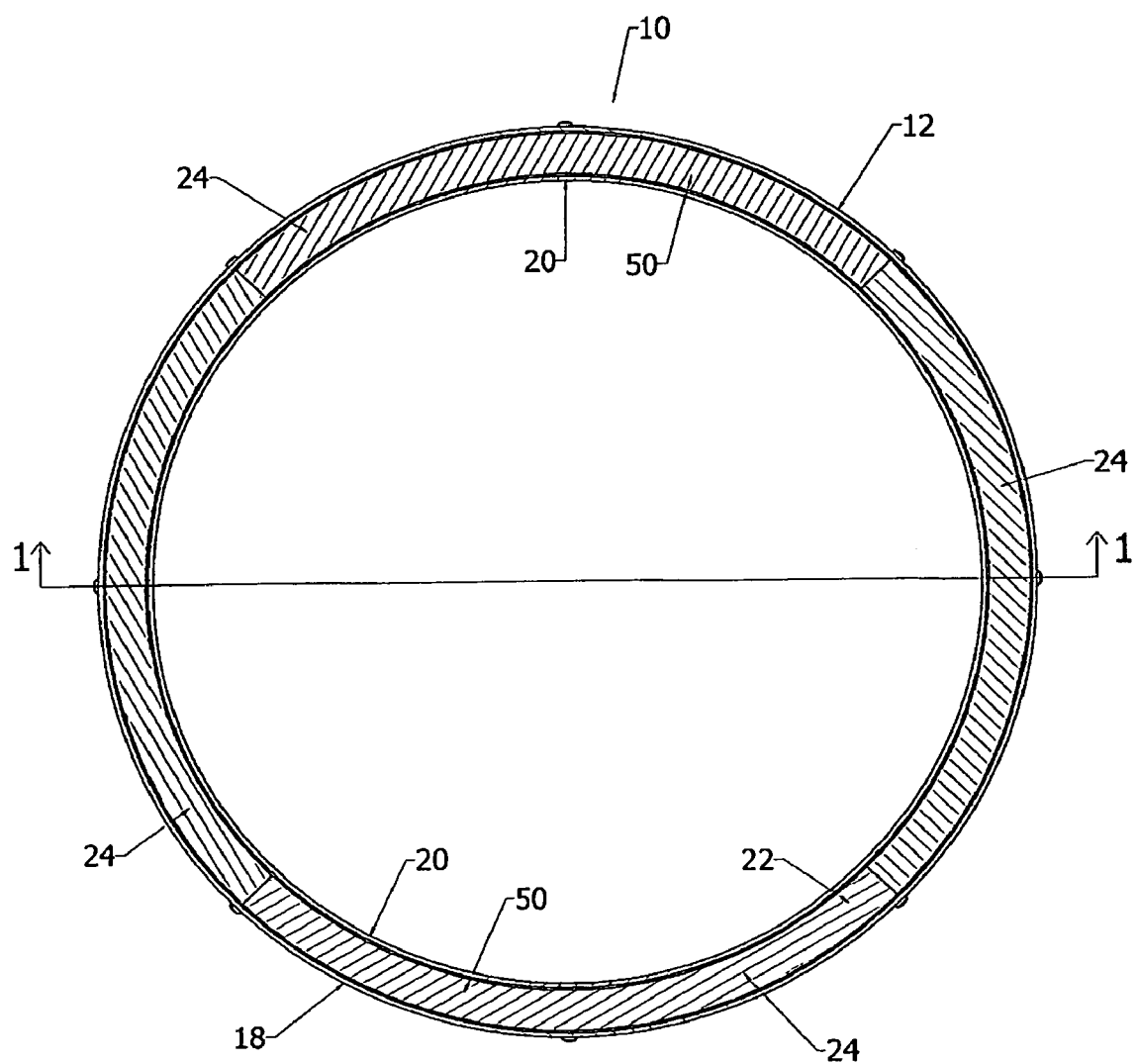
FIG. 2 shows a cross sectional plan view of the embodiment of claim 1.

The invention is now illustrated by reference to preferred embodiments thereof. Numeral 10 indicates a ventilation chimney section of the invention. Section 10 includes cylindrical tube 12, male end coupling 14 and female end coupling 16. Tube 12 has outer cylindrical tube 18, inner cylindrical tube 20, separated by cylindrical insulation 22 filling space 50 between tubes 18 and 20. Tubes 18 and 20 are made by welding opposed edges of a plastic sheet to form a cylindrical tube. Typically the sections are 2, 3 and 4 feet long (approximately 60, 90 and 120 cm) and 16, 18, 22 or 25 inches inner diameter (approximately 40, 45, 60 and 63 cm), these dimensions are those requested and preferred by purchasers although other lengths and diameters may be used, and custom supplied. Typically the plastic sheets are polyethylene and about ⅛ inch thick (approximately 3 mm, although other plastics of similar properties can be used instead, and the thickness can be similarly varied, as known by those skilled in the art. Inner tube 20 when placed within outer tube 18 is spaced apart about 1⅛ inch (approximately 2.8 or 2.9 cm) forming space 50. This gap is filled by a 1 inch thick (approximately 2½ cm) insulating polystyrene sheet 22, which may be cut into four quarter cylinders, and is typically foamed, other insulating plastics of similar properties can be used instead. In manufacture polyethylene sheets are cut to size, as is a polystyrene sheet. The polyethylene sheets are edge welded to form cylindrical tubes 18 and 20 placed concentrically within each other and polystyrene 22 slid between them preferably as four quarter cylinders 24. Male coupling 14 and female coupling 16 are inserted into ends 26 and 28 of tube 12 and secured by screws 30 passing through outer tube 18 into couplings 14 and 16, plastic rivets may be used instead of screws 30. Male coupling 14 has collar 32 to engage space 50 between inner tube 20 and outer tube 18, collar 32 joins circumferential wall 34 at the inner edge of which is sleeve 36, the inner surface of wall 34 and sleeve 36 are aligned with the inner surface of inner tube 20 to form fluid passage 38. The outer surface of sleeve 36 forms plug 40. Female coupling 16 has collar 42 to engage space 50, collar 42 joins circumferential wall 44 at the outer edge of which is sleeve 46. the inner surface of wall 44 is aligned with the inner surface of inner tube 20 to form fluid passage 48. Wall 44 and sleeve 46 together form socket or plug insertion port or plug receiving hole 52, with edge recess 54. Plug 40 and socket 52 are dimensioned to matingly engage similar elements on other sections. Couplings 14 and 16 are typically polyurethane foam, although other suitable materials of like properties may be used as known to those skilled in the art. Collars 32 and 42 are typically about 1½ inch deep (approximately 3.8 cm) and 1 inch wide (approximately 2½ cm) to fit into space 50, itself about 1⅛ inch across (approximately 2.8 or 2.9 cm), wall 34 and sleeve 36 together extend about 2½ inch (approximately 6.3 or 6.4 cm) from the end of tube 12, as do wall 44 and sleeve 46. Sleeve 36 is about 1 inch (approximately 2½ cm) thick, as is edge recess 54. Sections 10 are joined together at installation by a suitable compatible plastic adhesive applied between plug 40 and socket 52. In general tolerances throughout are of the order of ⅛ inch.

Although the terms "polyethylene," "polystyrene," "foam polystyrene," and "polyurethane" are used, these are illustrative only, as is well understood by those skilled in the art, each of these substances has equivalents of similar properties that can be used instead, and the invention is not restricted to the particular named conventional substances.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A method of manufacture of a ventilation chimney section comprising:

the step of welding a plastic sheet to form an outer cylindrical tube, and the step of welding a plastic sheet to form an inner cylindrical tube, and the step of placing said inner tube within said outer tube, and the step of cutting a sheet of insulation into a plurality of segments, and the step of aligning said segments parallel to the common axis of said tubes, and the step of sliding said segments aligned parallel to said common axis between said tubes, said segments filling the space between said tubes.

2. Method of claim 1, wherein the step of cutting said sheet of insulation into segments comprises:

the step of cutting said sheet into four segments, and the step of sliding said segments between said tubes, whereby each said segment forms a quarter cylindrical segment between said tubes.

3. Method of claim 2, additionally comprising:

the step of inserting a collar of a male coupling element into an end of said section between said inner and outer tubes, and the step of securing said collar of said male coupling element between said tubes, and the step of inserting a collar of a female coupling element into an end of said section between said inner and outer tubes, and the step of securing said collar of said female coupling element between said tubes, said male coupling element being adapted to matingly engage a female coupling identical to said female coupling element and vice versa.

4. Method of claim 3, comprising the step of securing said collar of said male coupling element between said inner and outer tubes by fasteners, and the step of securing of said collar of said female coupling element between said inner and outer tubes by fasteners.

5. Method of claim 4, comprising the step of securing said collar of said male coupling element between said inner and outer tubes by screws, and the step of securing of said collar of said female coupling element between said inner and outer tubes by screws.

6. Method of claim 1, additionally comprising:
the step of inserting a collar of a male coupling element into an end of said section between said inner and outer tubes, and
the step of securing said collar of said male coupling element between said tubes, and
the step of inserting a collar of a female coupling element into an end of said section between said inner and outer tubes, and
the step of securing said collar of said female coupling element between said tubes,
said male coupling element being adapted to matingly engage a female coupling identical to said female coupling element and vice versa.

7. Method of claim 6, comprising the step of securing said collar of said male coupling element between said inner and outer tubes by fasteners, and the step of securing of said collar of said female coupling element between said inner and outer tubes by fasteners.

8. Method of claim 7, comprising the step of securing said collar of said male coupling element between said inner and outer tubes by screws, and
the step of securing of said collar of said female coupling element between said inner and outer tubes by screws.

9. Chimney ventilation section comprising coaxial inner and outer plastic tubes separated by a sheet of insulation filling the space between said inner and outer tubes, and
said sheet of insulation has a plurality of segments aligned parallel to the common axis of said tubes and
a collar of a male coupling element is inserted into one end of said section between said inner and outer tubes and secured therein, and
a collar of a female coupling element is inserted into the other end of said section between said inner and outer tubes and secured therein, said male coupling element being adapted to matingly engage a female coupling identical to said female coupling element and vice versa, and
said collars are secured between said inner and outer tubes by fasteners.

10. Section of claim 9, wherein said sheet of insulation has four quarter cylindrical segments aligned parallel to the common axis of said tubes.

11. Section of claim 10, wherein said fasteners are screws extending through said outer tube and into said collars.

12. Section of claim 10, wherein said male coupling element has a first circumferential wall abutting the collar of said male coupling element projecting outward, a first inner cylindrical sleeve at the inner edge of said first circumferential wall said first sleeve forming a plug to engage a socket of a female coupling element.

13. Section of claim 10 wherein said female coupling element has a second circumferential wall abutting said collar projecting outward, and a second outer cylindrical sleeve at the outer edge of said circumferential wall, said second sleeve and said second wall forming a socket to engage a plug of a male coupling element.

* * * * *